UNITED STATES PATENT OFFICE.

ALEXANDER W. BRINKERHOFF, OF UPPER SANDUSKY, OHIO.

PROCESS OF MAKING COMPOUNDS FOR TREATMENT OF PILES.

SPECIFICATION forming part of Letters Patent No. 241,288, dated May 10, 1881.

Application filed December 4, 1880. (Specimens.)

*To all whom it may concern:*

Be it known that I, ALEXANDER W. BRINKERHOFF, of Upper Sandusky, in the county of Wyandot and State of Ohio, have invented a new and valuable Improvement in Processes for Making Compounds for the Treatment of Piles, &c.; and I do hereby declare that the following is a full, clear, and exact description of the same.

This invention relates to a process for making compounds for the treatment and cure of hemorrhoids or piles and other congested tumors and growths; and it consists in combining with an oil or other suitable vehicle, reduced to a temperature at or about 24° Fahrenheit above zero, crystallized carbolic acid previously melted or dissolved.

The object of the invention is to secure at all times a compound of uniform strength, wherein carbolic acid enters as the active agent, regardless of the strength of the acid crystals used, as these latter often vary in strength.

In order to compound this preparation I employ the best of sperm or other suitable oil, or glycerine, or any suitable vehicle for the acid, and pure crystals of carbolic acid previously melted or dissolved according to art. Chemically pure crystallized carbolic acid is not essential, however, to the success of the process, as acids of various strengths may be employed without in any manner preventing the efficacy of the compound, as the oil or vehicle will at a given temperature hold in suspension only a certain proportion of acid at the period when feathery crystals appear. Consequently the varying strength of acids will not affect the uniformity of strength in the compound, as the vehicle will take up but so much of the acid at the time said crystals appear.

The usual process for compounding this preparation is as follows: In an open vessel of sufficient depth I place an open wide-mouthed bottle containing the oil or vehicle to be used to about two-thirds of its capacity. I then surround the bottle containing the oil with crushed ice, water, and salt up to the line of the oil in the bottle. In this refrigerant I then introduce a thermometer, (Fahrenheit,) and continue the addition of salt to the refrigerating mass or fluid until the desired temperature is attained. I then add gradually the carbolic acid, previously dissolved or melted, to the oil or vehicle in the bottle, stirring it, and continue this operation until the first appearance of feathery crystals in the oil, when the process is concluded and the compound ready for use.

This compound is intended for hypodermic uses, and is introduced into the sacs or tumors, by means of the ordinary hypodermic syringe, in quantities varying from two to eight drops or minims, as the condition and size of the sac or tumor may suggest to the operator.

The tumors are treated each singly or one at a time, from six to ten days apart, one injection to each usually sufficing for a cure.

The sacs or tumors yield rapidly to this treatment and soon slough off.

This operation is wholly or nearly painless throughout, and in my experience has proved eminently successful, rendering it a valuable remedy for those who unfortunately suffer from that well-known and painful affection commonly called "piles."

Having described my invention or discovery sufficiently to enable those skilled in the art to compound it, what I claim, and desire to secure by Letters Patent, is—

The herein-described process of compounding a mixture for the treatment of piles and the like, consisting in first placing in an open-mouthed vessel, to about two-thirds of its capacity, sperm-oil, glycerine, or a similar vehicle, surrounding the vessel with crushed ice, salt, and water until the vehicle is reduced to a temperature of 24°, or thereabout, and then pouring in carbolic acid in a liquid form until feathery crystals appear in the vehicle, as set forth.

In testimony that I claim the above I have hereunto subscribed my name in the presence of two witnesses.

ALEXANDER W. BRINKERHOFF.

Witnesses:
ALLEN SMALLEY,
M. H. BRINKERHOFF.